US007516157B2

(12) United States Patent
Cameron et al.

(10) Patent No.: US 7,516,157 B2
(45) Date of Patent: Apr. 7, 2009

(54) RELATIONAL DIRECTORY

(75) Inventors: Kim Cameron, Bellevue, WA (US);
Mark Brown, Seattle, WA (US);
Matthias Leibmann, Woodinville, WA (US); James H. Booth, Barrie (CA);
Max L. Benson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 424 days.

(21) Appl. No.: 10/434,726

(22) Filed: May 8, 2003

(65) Prior Publication Data

US 2004/0225670 A1  Nov. 11, 2004

(51) Int. Cl.
G06F 7/00 (2006.01)
G06F 17/00 (2006.01)
(52) U.S. Cl. ............... 707/103 R; 707/100; 707/101
(58) Field of Classification Search .......... 707/100, 707/101, 103 R
See application file for complete search history.

(56) References Cited

U.S. PATENT DOCUMENTS

| | | | |
|---|---|---|---|
| 4,648,036 A | 3/1987 | Gallant | 707/203 |
| 4,999,766 A | 3/1991 | Peters et al. | 707/10 |
| 5,838,923 A | 11/1998 | Lee et al. | 709/236 |
| 5,884,328 A | 3/1999 | Mosher, Jr. | 707/202 |
| 5,893,116 A | 4/1999 | Simmonds et al. | 707/201 |
| 6,105,062 A * | 8/2000 | Andrews et al. | 709/223 |
| 6,185,574 B1 | 2/2001 | Howard et al. | 707/200 |
| 6,202,085 B1 | 3/2001 | Benson et al. | 709/205 |
| 6,269,406 B1 * | 7/2001 | Dutcher et al. | 709/248 |
| 6,343,287 B1 * | 1/2002 | Kumar et al. | 707/4 |
| 6,370,541 B1 | 4/2002 | Chou et al. | 707/103 X |
| 6,381,734 B1 | 4/2002 | Golde et al. | 707/1 |
| 6,496,837 B1 * | 12/2002 | Howard et al. | 707/200 |
| 6,523,042 B2 * | 2/2003 | Milleker et al. | 707/102 |
| 6,542,515 B1 | 4/2003 | Kumar et al. | 370/463 |
| 6,581,074 B1 | 6/2003 | Wong et al. | 707/201 |
| 6,618,732 B1 * | 9/2003 | White et al. | 707/103 R |
| 6,651,047 B1 | 11/2003 | Weschler, Jr. | 707/1 |
| 6,757,720 B1 | 6/2004 | Weschler, Jr. | 709/220 |
| 6,823,336 B1 | 11/2004 | Srinivasan et al. | 707/8 |
| 6,834,286 B2 * | 12/2004 | Srinivasan et al. | 707/103 R |
| 6,859,217 B2 | 2/2005 | Robertson et al. | 715/853 |
| 6,912,520 B2 * | 6/2005 | Hankin et al. | 707/1 |
| 6,961,734 B2 * | 11/2005 | Kauffman | 707/103 Z |
| 6,983,227 B1 | 1/2006 | Thalhammer-Reyero | 703/2 |
| 6,990,513 B2 | 1/2006 | Belfiore et al. | 709/203 |
| 7,310,650 B1 * | 12/2007 | Felsted et al. | 707/103 R |
| 2001/0034733 A1 * | 10/2001 | Prompt et al. | 707/102 |
| 2001/0044805 A1 | 11/2001 | Multer et al. | 707/201 |

(Continued)

OTHER PUBLICATIONS

Zhou, Tao, "Directory Integration and the Metadirectory", Jul. 1999 Edition of Windows IT Pro, pp. 1-10.*

(Continued)

*Primary Examiner*—Charles Rones
*Assistant Examiner*—Phuong-Thao Cao
(74) *Attorney, Agent, or Firm*—Lee & Hayes, PLLC

(57) ABSTRACT

Exemplary methods and systems provide a relational directory of organizational information. Organizational data objects and their associated attributes are maintained in a relational directory. An organizational hierarchy is converted to a relational directory using projection, joining, and import attribute flow rules. Attributes in a relational directory may be exported out of the relational directory to a hierarchical directory.

18 Claims, 11 Drawing Sheets

U.S. PATENT DOCUMENTS

| | | | |
|---|---|---|---|
| 2001/0051948 A1* | 12/2001 | Srinivasan et al. | 707/102 |
| 2002/0030703 A1 | 3/2002 | Robertson et al. | 715/853 |
| 2002/0059425 A1* | 5/2002 | Belfiore et al. | 709/226 |
| 2002/0156792 A1 | 10/2002 | Gombocz et al. | 707/100 |
| 2003/0101194 A1* | 5/2003 | Rys et al. | 707/101 |
| 2003/0105654 A1 | 6/2003 | MacLeod et al. | 705/7 |
| 2003/0131025 A1 | 7/2003 | Zondervan et al. | 707/200 |
| 2003/0135517 A1* | 7/2003 | Kauffman | 707/103 R |
| 2003/0140210 A1 | 7/2003 | Testardi | 711/203 |
| 2003/0145003 A1 | 7/2003 | Yellepeddy et al. | 707/6 |
| 2003/0163438 A1 | 8/2003 | Barnett et al. | 707/1 |
| 2003/0208490 A1 | 11/2003 | Larrea et al. | 707/9 |
| 2004/0064502 A1* | 4/2004 | Yellepeddy et al. | 709/203 |
| 2004/0122844 A1 | 6/2004 | Malloy et al. | 707/102 |
| 2004/0230559 A1 | 11/2004 | Newman et al. | 707/1 |
| 2005/0188367 A1 | 8/2005 | Oberholtzer | 717/168 |

OTHER PUBLICATIONS

Tao Zhou, "Directory Integration and the Metadirectory", from the Jul. 1999 Edition of Windows IT Pro, pp. 1-10 (Provided in the previous office letter).*

Robertson, George; Cameron, Kim; Czerwinski, Mary; Robbins, Daniel; "Polyarchy Visualization: Visualizing Multiple Intersecting Hierarchies"; CHI 2002, Minneapolis, Minnesota, USA; Apr. 20-25, 2002; 8 pages.

Steen et al. "Integrating ABB Aspect Directory with Microsoft Active Directory", Thesis Paper, The Department of Computer Science and Electronics Malardalens Hogeskola University, 2001, pp. 44-58.

Steen et al., Master Thesis in Computer Engineering; Integrating ABB Aspect Directory with Microsoft Active Directory; 76 pages.

McCauley, et al, "Nets Users Guide", retrieved Aug. 21, 2008 at <<http://web.archive.org/web/20020224144453/http://www.open.com.au/nets/user.html>> Revision 2.2, Feb. 24, 2002, pp. 1-83.

* cited by examiner

RELATIONAL DIRECTORY

CROSS-REFERENCE TO RELATED APPLICATION

The present application is related to co-pending U.S. patent application Ser. No. 10/435,113, entitled "Declarative Rules for Metadirectory," by Kim Cameron, Max L. Benson, and James Booth; U.S. patent application Ser. No. 10/434,725, entitled "Attribute Value Selection for Entity Objects," by Kim Cameron, Max L. Benson, Matthias Leibmann, Edward H. Wayt, Kevin Miller and James Booth (U.S. Pat. No. 7,330,853); U.S. patent application Ser. No. 10/435,720, entitled "Associating and Using Information in a Metadirectory," by Max L. Benson; U.S. patent application Ser. No. 10/435,712, entitled "Preview Mode," by Kim Cameron, Max L. Benson, Derek Murman, Edward H. Wayt, Jeffrey Bisset, Jie Liu, and Jing Wu (U.S. Pat. No. 7,257,603); U.S. patent application Ser. No. 10/435,708, entitled "Rules Customization and Related Methods," by Kim Cameron, Matthias Leibmann, Max L. Benson, Jing Wu, Michael Jerger, Edward H. Wayt, and Kenneth Mark (U.S. Pat. No. 7,240,073); U.S. patent application Ser. No. 10/434,411, entitled "Automated Information Management and Related Methods," by Stephen Siu, Max L. Benson, and James Booth, all of which are filed concurrently herewith, assigned to the assignee of the present application, and incorporated herein by reference for all that they teach and disclose.

TECHNICAL FIELD

The described subject matter relates generally to methods, devices, systems for storing and/or processing information.

BACKGROUND

Companies and other organizations typically maintain information about many different aspects of the organization in order to ensure smooth operation. This organizational information (or organizational data) describes people, resources, applications, and the like, which make up the organization. For example, organizational information descriptive of an employee may include his/her name, job title, salary, telephone number, and/or Internet Protocol (IP) address. Organizational information describing an application may include the application's name and associated services provided by the application. Organizational information describing a resource may describe the resource as a network device (e.g., a printer), the name of the device, and capabilities provided by the network device. Many other types of organizational information may be maintained. In order to be of most use to an organization, the organizational data should be consistent across the organization, readily accessible, and managed such that the data provides maximum benefit to the organization.

The organizational data is often maintained in data storage repositories called directories. Traditional directories are hierarchical. For example, directories in the X.500 standard are hierarchical with different levels, or nodes, for each category of information. The Lightweight Directory Access Protocol (LDAP) is based on the X.500 standard, and also specifies a hierarchical namespace.

In many organizations, many different directories are maintained independently, and may include common data that can become inconsistent across the directories. For example, the human resources (HR) department may have a hierarchical directory containing information about each employee, stored according to job title, while the information technology (IT) department may have a hierarchical directory containing information about each email address, stored with the associated employee name, and according to department. In such an environment, it is relatively easy for common data to become inconsistent among the departments.

To avoid inconsistencies, existing systems, such as metadirectories, attempt to identify common data among the multiple directories, and enforce consistency among the data. Identifying common data is often a difficult task, in part because of the different hierarchies present in the organization. Typically, to identify data that is common among directories, the metadirectory system must search all the various hierarchies to find common data. For example, the system may traverse the HR hierarchy gathering all employee names, and then traverse the IT hierarchy, identifying employee names associated with IT email data. As another example, in order to add a node (e.g., an "IP address" node) under each employee, every hierarchy of every directory must be traversed to find the employee node and insert the IP address node. Traversing, searching, and analyzing these hierarchies is a time-consuming and resource intensive process.

In addition, changing the layout of a hierarchy due to changing business needs, is often difficult or impractical, without a redesign to the metadirectory system. For example, the HR department may change its hierarchy from having a "job title" parent node and "employee name" child node to a hierarchy having a "job title" parent node, a "location" child node, and an "employee name" grandchild node. A metadirectory system that is designed to interface with the first exemplary two-node hierarchy may likely be incompatible with the second exemplary hierarchy because the second hierarchy includes a third node (i.e., "location") that does not exist in the hierarchy for which the metadirectory was designed.

Conversely, the relatively permanent nature of many hierarchies can also be a drawback, in part because, once a department has deployed a hierarchy, the department is often reluctant to change the hierarchy to more closely match a hierarchy of another department. Organizations' departments typically attempt to design a persistent hierarchy, which will not have to change over time, and which will have a structure and data types most useful to that department. Typically, the hierarchical structure and data types used by one department will not match those of another department.

For example, the HR department may be more interested in maintaining employee information in an employee-centric structure, whereas the IT department may be interested in maintaining network information in a network-centric structure. While the two structures probably contain common data (e.g., employee names, phone numbers, email addresses, etc.), accessing that information requires two different processes (i.e., traversing two different hierarchies). One way to reduce processing might be to impose the HR hierarchy on the IT hierarchy, or vice versa; however, this is not a good solution, because the HR hierarchy is not the most useful structure, and does not contain the most useful data types for the IT department, and vice versa.

SUMMARY

Implementations described and claimed herein solve the discussed problems, and other problems, by providing a relational directory of organizational information. Exemplary systems maintain organizational data objects and their associated attributes, in a relational format, thereby enabling rapid identification of inconsistencies among data, rapid access of data, providing of data relationships not provided by hierarchies, and other benefits.

Exemplary methods, systems, and devices have been developed for receiving a hierarchical organizational directory having one or more nodes with data and converting the hierarchy into a relational directory having data entries with associated attribute values.

An exemplary system includes a metadirectory operable to receive a hierarchical organizational directory having one or more nodes with data, and convert the hierarchy into a relational directory having data entries with associated attribute values.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
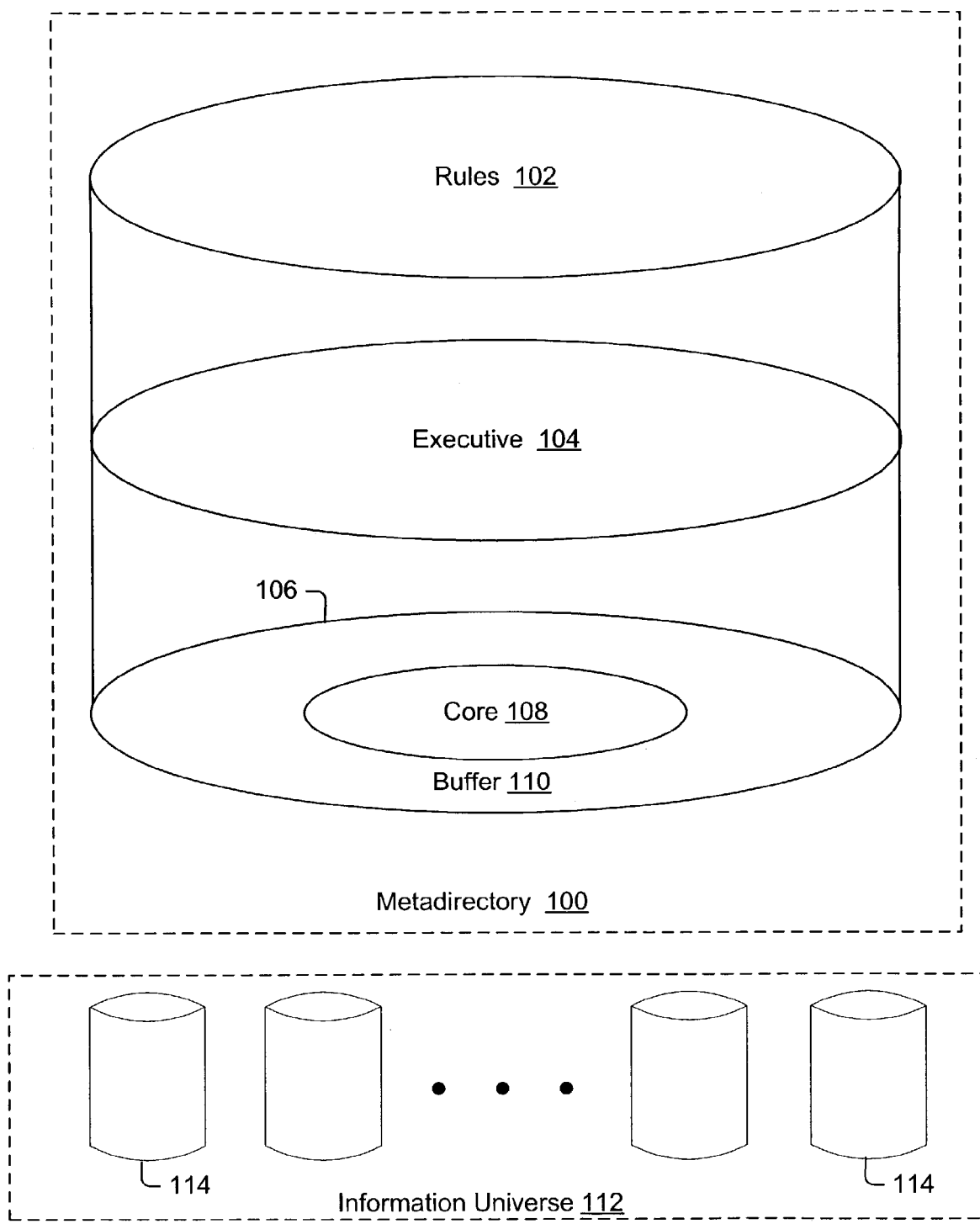
FIG. 1 is a block diagram illustrating an exemplary multilayer architecture for use in a metadirectory scenario.

Turning to the drawings, wherein like reference numerals refer to like elements, various methods are illustrated as being implemented in a suitable computing environment. Although not required, various exemplary methods will be described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including hand-held devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Overview

Various technologies are described herein that pertain generally to management of organizational information. Various exemplary methods, units and/or systems optionally include, and/or operate in conjunction with, an architecture that supports local and/or global interoperability. For example, an exemplary architecture may accommodate objectives such as fault tolerance, performance, scalability and flexibility for use in organizational information acquisition, deployment and/or maintenance environments. In this example, the architecture has one or more layers, such as, but not limited to, a rules layer, an executive layer, and/or a storage layer.

In a multilayer architecture, while a fully partitioned data model is possible (e.g., ISO/OSI Network Model), strengths implicit in one layer are optionally exploited to mitigate weaknesses of another layer. For example, functions and/or methods in an exemplary architecture optionally overlap between layers to provide a greater degree of flexibility and redundancy from both an implementation and operation perspective. In such an overlapping architecture, various layers may operate to provide data storage at the executive layer, and/or the rules layer.

In general, a rules layer includes policies, schemas, data mapping, data translation, and/or other functionality. Such policies, schemas, data mapping, data translation, and/or functionality are optionally provided in a computing environment having units and/or components that rely on one or more platforms and/or operating systems. In a typical computing environment, or system, such units and/or components optionally operate autonomously, synchronously and/or asynchronously.

An exemplary executive layer optionally performs information import, export, retrieval, processing, mapping, and/or synchronization management services. For example, an executive layer may provide for receiving organizational information and projecting the information into the storage layer according to mapping policies in the rules layer. An executive layer optionally includes APIs and/or other interfaces to access hardware and/or software functionality. For example, an exemplary executive layer specifies one or more APIs that expose functionality and allow for any degree of local and/or global interoperability. Such interoperability may allow for management and/or workflow integration across one or more computing environments. For example, an executive layer may provide organizational information management services or central repository management services that allow for data reconciliation and/or access to one or more computing environments (e.g., client environments, data repositories, etc.).

An exemplary storage layer includes a buffer storage area and a core storage area. The core storage area may be viewed as an aggregated combination of organizational information from a number of data repositories. The core storage area may also be viewed as a metadirectory having referencing remote data or directories. The buffer storage area may be used as a staging area, wherein organizational data is received from one or more data repositories and processed before affecting a change in the core storage area. In general, a control and/or messaging layer can include any type of data storage components as may be known in the art, including, but not limited to, disk drives, RAID systems, optical storage media, network server, in one or more computing environments, in a platform independent manner.

Thus, as described herein, various exemplary units are suitable for use in a multilayered architecture. For example, to operate in conjunction with an executive layer, an exemplary unit may include APIs to expose hardware and/or software functionality beyond the unit (e.g., to one or more other computing environments). An exemplary unit may also communicate synchronized organizational information via operation of one or more layers. Further, an exemplary unit optionally serves as the core of a metadirectory. In general, an exemplary system may include an internal multilayer architecture that supports interoperability of internal units and/or components; an exemplary unit may also operate in conjunction with and/or support a multilayer architecture that extends beyond the system as well.

Various aspects of agility, extensibility, compatibility and/or interoperability optionally allow for preservation of existing platforms and processes. For example, exemplary methods, units and/or architectures optionally allow for streamlining organizational data management, archival, and synchronization in a heterogeneous data storage environment. In addition, implementation of such methods, units and/or architectures does not necessarily force a disruption of traditional processes (i.e., optionally preserves traditional acquisition, processing, transmission and/or other processes).

By optionally adhering to emerging standards for organizational data, data transport protocols, data formats, metadata and event management, various technologies described herein can readily accommodate legacy, current and emerging components anywhere in an organizational data storage system. While such an approach has numerous advantages at first implementation, other significant advantages may be realized over the extended life of the business needs served.

Various exemplary methods, devices, systems, and/or storage media are described with reference to front-end, intermediate, back-end, and/or front-to-back processes and/or systems. While specific examples of commercially available hardware, software and/or media are often given throughout the description below in presenting front-end, intermediate, back-end and/or front-to-back processes and/or systems, the exemplary methods, devices, systems and/or storage media, are not limited to such commercially available items.

Exemplary Architecture

Referring to FIG. 1, three layers of an exemplary metadirectory 100 are shown. The metadirectory 100 includes a rules layer 102 (described in more detail with reference to FIG. 3); an executive layer 104 (described in more detail with reference to FIG. 4); and a storage layer 106, having a core 108 and a buffer 110 (described in more detail with reference to FIG. 2). The metadirectory 100 is in operable communication with an exemplary information universe 112, which includes one or more remote repositories 114 of information.

Figure 2:
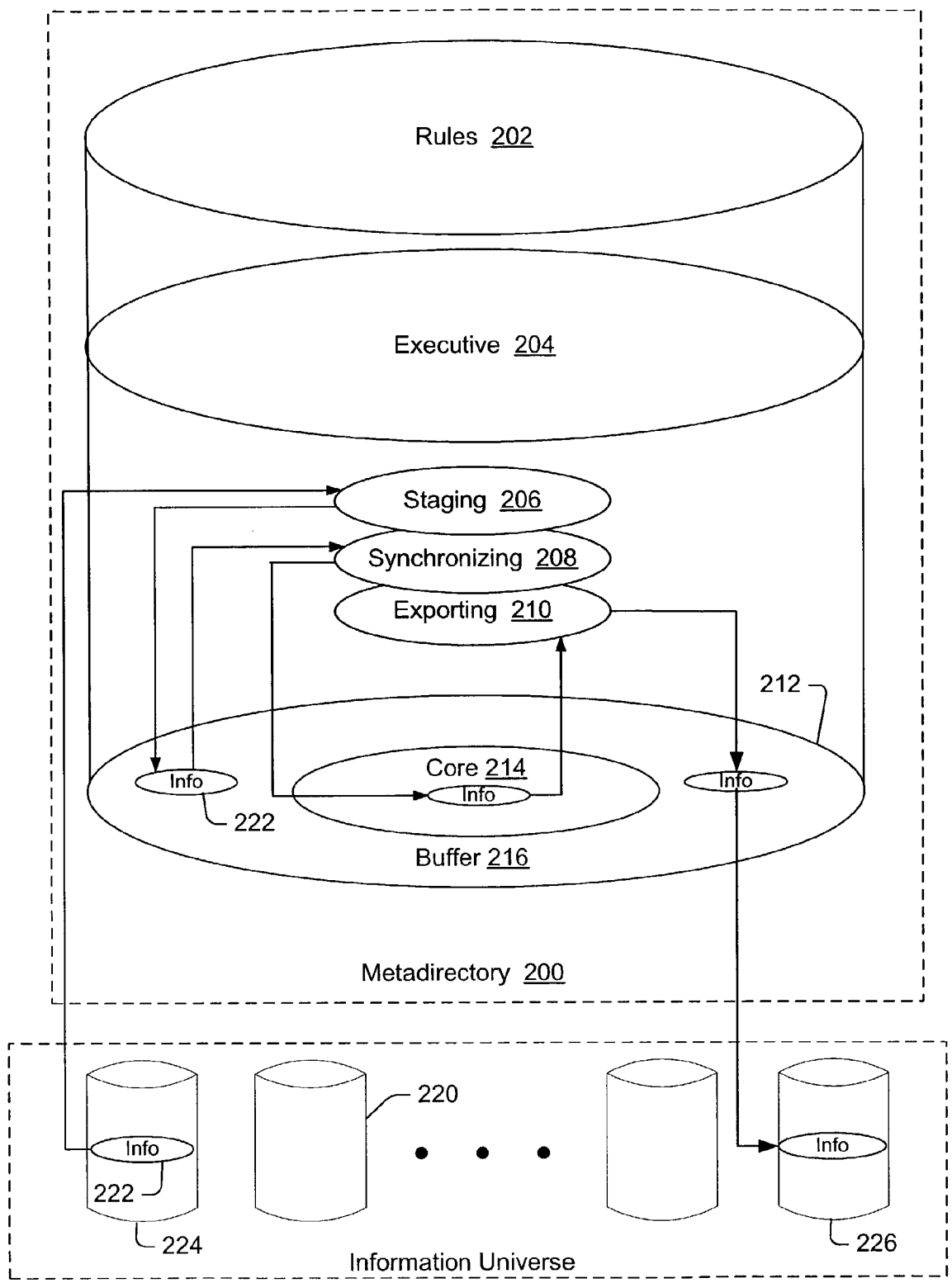
FIG. 2 is a block diagram illustrating another exemplary multilayer architecture for use in a metadirectory scenario.

Referring to FIG. 2, another exemplary metadirectory 200 is shown having six exemplary layers: a rules layer 202, an executive layer 204, a staging layer 206, a synchronizing layer 208, and exporting layer 210, and a storage layer 212. As in FIG. 1, the storage layer 212 includes an exemplary core 214 and an exemplary buffer 216. An exemplary information universe 218 including one or more exemplary information repositories 220, is in operable communication with the metadirectory 200. In the exemplary metadirectory 200, the staging layer 206, the synchronizing layer 208, and the exporting layer 210 may be part of, or work in conjunction with, the executive layer 204, to stage, synchronize, and/or export information between the information universe 218 and the metadirectory 200.

Generally, information 222 from a repository 224 is communicated to the metadirectory 200. The exemplary staging layer 206 buffers the information 222 in the buffer 216 in accordance with rules in the rules layer 202. The synchronizing layer 208 may synchronize (i.e., reconcile) the information 222 with other information in the metadirectory 200 according to rules in the rules layer. The exemplary synchronizing layer 208 may include a synchronizing engine that performs various synchronizing functions. The exemplary rules layer 202 may include a rules engine to interface with the staging layer 206, the synchronizing layer 208, and the export layer 210, and perform functions necessary to apply the rules.

From the buffer 216, an association may be made between the information 222 in the buffer 216 and information in the core 214. For example, the information 222 may be copied into the core 214. The information 222 may then be moved out of the core into the buffer 216, where it is prepared to be exported out to the remote repositories 220. The exemplary export layer 210 exports (i.e., propagates) the information out to repository 226, according to the rules of the rules layer 202, thereby ensuring that the repository 224 and the repository 226 have consistent information 222.

The exemplary storage layer 212 includes any storage media as may be known in the art. The core 214 and the buffer 216, likewise, include any storage media as may be known in the art. The storage layer 212, core 214, and buffer 216 may also include application programming interfaces (APIs), as well as processing functionality, for handling calls to store, format, retrieve, and otherwise process information at the storage layer 212. For example, the storage layer 212 may include a structured query language database (SQL), in which the storage layer 212 handles queries to a database. In an exemplary implementation, the metadirectory core and/or buffer may be configured as a flat namespace(s).

The exemplary remote repositories 220 include storage media to store information, as well as any data handling functionality as may be necessary to communicate the information to and from the metadirectory 200. Exemplary types of repositories 220 are network operating systems (e.g., Microsoft Windows NT®), directory services (e.g., Active Directory®, Novell eDirectory®, SunONE/iPlanet Directory®, X.500 systems), email systems (e.g., Lotus Notes®, Microsoft Exchange 5.5®), application systems (e.g., PeopleSoft®), Enterprise Resource Planning (ERP), telephone switches, and Extensible Markup Language (XML) and Directory Services Markup Language (DSML) systems), database systems (e.g., Microsoft® SQL Server, Oracle®, and IBM DB2®), and file-based systems (e.g., DSMLv2, Lightweight Directory Interchange Format (LDIF), and delimited, fixed width, and/or attribute value pairs text documents).

In an organizational setting, the information 222 represents any entity that an organization wants to represent, observe, track, analyze, and/or otherwise monitor using computer means. Examples of entities are employees, accounts, resources, applications, and the like. In one implementation, the information 222 is an object having attributes (i.e., properties) that are descriptive or representative of the entity. Thus, an object representing an employee may include attributes such as the employee's name, social security number, phone number, title, department, address, etc. While the information 222 is described herein as being an object, the information 222 may be any computer-implemented representation of an entity.

As discussed below in more detail, in one implementation, objects in the buffer 216 can be connector objects or disconnector objects. A connector object is an object that is linked to an object in the core 214. A disconnector object is an object that is not linked to an object in the core 214. By linking, or not linking, objects in the buffer 216 to objects in the core 214, according to rules in the rules layer 202, unique combinations of data objects and attributes can be designed into the core 214, whereby the core 214 may be considered a rules-directed aggregate of information from the information universe 218. In this exemplary implementation, utilizing connector objects and disconnector objects, the buffer 216 may be referred to as a connector space, and the core 214 may be referred to as an aggregate space.

Figure 3:
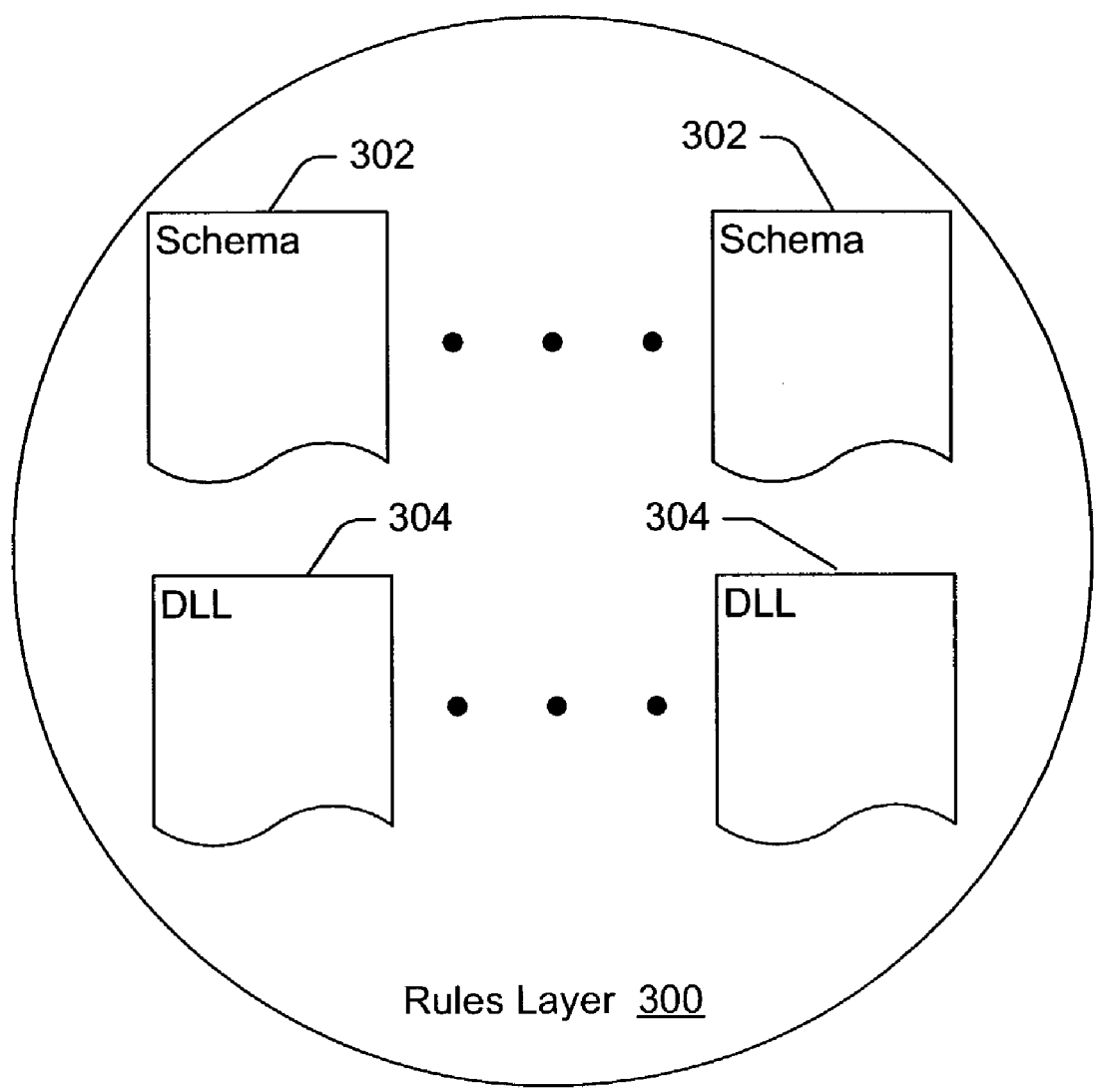
FIG. 3 is a block diagram illustrating an exemplary rules layer.

FIG. 3 illustrates an exemplary rules layer 300. The exemplary rules layer 300 includes one or more schemas 302, and one or more dynamic-link libraries (dlls) 304, which are used to ensure that information flow into, within, and out of, a metadirectory (e.g., the metadirectory 100, FIG. 1; and the metadirectory 200, FIG. 2) is in accordance with metadirectory policies. Thus, it is to be understood that use of schemas 302 are only one mechanism for assuring conformance to metadirectory policies, and that other mechanisms besides schemas may be used instead of, or in addition to, schemas without deviating from the scope.

Each of the exemplary schemas 302 is a model for describing the structure of information processed by the metadirectory. In general, a separate schema may be developed and applied at any place within the metadirectory that information crosses a boundary. For example, with regard to the metadirectory 200 of FIG. 2, an import schema may be applied to the information 222 when the information 222 is received from the remote repository 224. As another example, a core schema may be applied to the information 222 when it is moved from the buffer 216 into the core 214. Schemas 302 may hold information such as system configuration information, data format specifications, and others.

More specifically, in a particular implementation, the following schemas are employed:
   Management Agent (MA) Schema,
   Connector filter Schema,
   Join Schema,
   Project Schema,
   Export Attribute Flow Schema,
   Run Configuration Schema,
   Import Attribute Flow Schema, and
   Metadirectory Core Schema.

The MA Schema models the structure of data received and processed by a management agent (described in more detail below). The Connector filter Schema models a rules engine filter that is employed by a synchronization engine during importing and/or exporting of data objects. The Join Schema models one or more rules for joining an object in a metadirectory buffer (e.g., the buffer 216, FIG. 2) with an object in a metadirectory core (e.g., the core 214, FIG. 2).

The Project Schema models one or more rules for projecting an object into a metadirectory core (e.g., the core 214, FIG. 2). The Export Attribute Flow Schema models one or more rules for flowing attributes from a metadirectory core (e.g., the core 214, FIG. 2) to an object in a metadirectory buffer (e.g., the buffer 216, FIG. 2). The Run Configuration Schema models execution of a management agent (described in more detail below).

The Import Attribute Flow Schema describes how attribute values should flow from an object in a metadirectory buffer (e.g., the buffer 216, FIG. 2) to an object in a metadirectory core (e.g., the core 214, FIG. 2). The Core Data Schema models configuration of a management agent (described in more detail below).

One or more DLL(s) 304 include sets of rules and/or specifications for managing data. An exemplary DLL 304 includes rules extensions that may be used by the metadirectory to combine data from two source attributes (e.g., sirName and givenName) and flow them to one target attribute (e.g., displayName).

In an exemplary implementation, the following types of rules may be specified in the rules layer 300, using schemas, or otherwise:
   attribute flow rules,
   connector filter rules,
   deprovisioning rules,
   export attribute flow rules,
   import attribute flow rules,
   join rules,
   mapping rules,
   projection rules, and
   provisioning rules.

Other rules may be implemented as may be useful to a particular metadirectory design. Brief descriptions of the rules above are as follow:

attribute flow rules (also called attribute flow precedence rules or attribute mapping rules): Attribute flow refers to synchronization of attributes between an object in the remote directories, the metadirectory buffer, and the metadirectory core. The attribute flow rules specify the process of attribute flow.

connector filter rules (also called disconnector rules): Rules that specify prevention of linking (connecting) of objects in the metadirectory buffer to objects in the metadirectory core.

deprovisioning rules: Rules that specify how a metadirectory buffer object is processed after it has been disconnected from a metadirectory core object.

export attribute flow rules: Export attribute flow refers to the process of flowing attributes of objects in the metadirectory core to objects in the metadirectory buffer. Export attribute flow rules specify the process of export attribute flow.

import attribute flow rules: Import attribute flow refers to the process of flowing attributes of objects in the metadirectory buffer to objects in the metadirectory core. Import attribute flow rules specify the process of import attribute flow.

join rules: Rule that specify the process of linking an object in the metadirectory buffer to an object in the metadirectory core.

mapping rules: Rules that establish a data flow relationship from a source attribute to a target attribute.

projection rules: Rules that specify the process of creating an object in the metadirectory core and linking the created object to another object in the metadirectory buffer.

provisioning rules: Provisioning is the process of creating, renaming, and/or deprovisioning objects in the metadirectory buffer based on a change to an object in the metadirectory core. Provisioning rules specify the process of provisioning.

Figure 4:
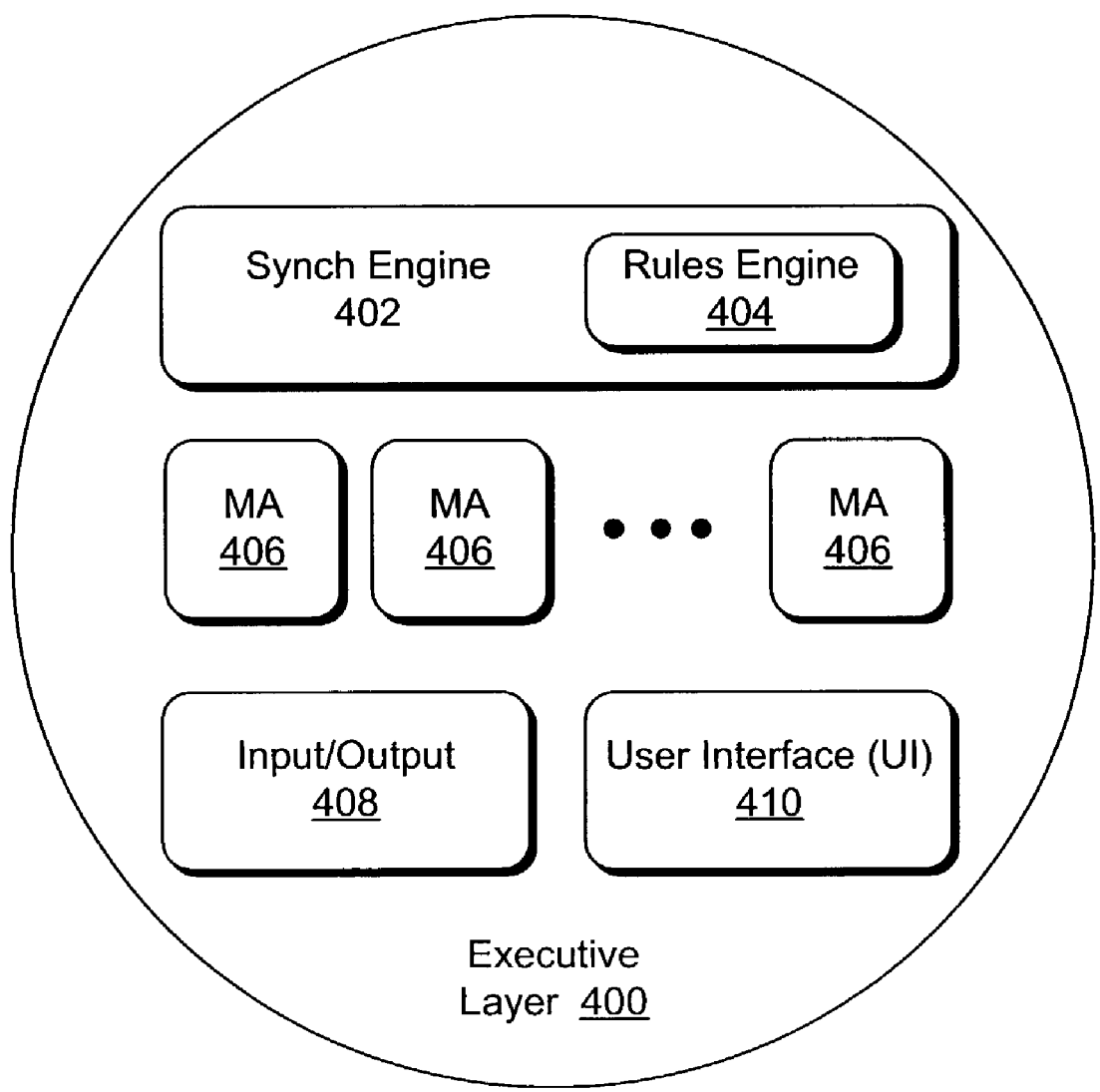
FIG. 4 is a block diagram illustrating an exemplary executive layer.

FIG. 4 is a block diagram illustrating an exemplary executive layer 400 for use in a metadirectory. In general, the executive layer 400 includes hardware, firmware, or computer-executable code modules (or any combination thereof) to implement one or more metadirectory services. The exemplary modules in the executive layer 400 are suitable for execution on a virtual machine, runtime engine, and the like, and are thereby useable in a .NET® environment. The exemplary executive layer 400 includes a synchronization engine 402, a rules engine 404, one or more management agents 406, an input/output module 408, and a user interface (UI) 410.

The exemplary synchronization engine 402 performs synchronization of objects in a metadirectory buffer and/or a metadirectory core. Synchronization refers to a process of maintaining consistency among multiple sources of data. In the context of an exemplary metadirectory, synchronization involves utilizing attribute flow precedence to combine similar data into a final version that is stored in the metadirectory core. This data is then exported from the metadirectory core to remote repositories.

The exemplary SE 402 may include a rules engine 404. An exemplary Rules Engine 404 provides rules analysis functions that direct the creation of objects and the flow of attributes within the metadirectory. For example, the rules engine 404 may analyze connector filter criteria associated with a buffer object to determine whether the buffer object should be connected (e.g., joined or projected) to an object in the metadirectory core.

The one or more exemplary MAs 406 communicates with remote data repositories to receive data objects, stage the objects, and transfer data objects out to the remote repositories. The exemplary MAs 406 convert repository information received in one format (e.g., Active Directory®, Oracle®) into an isomorphic form used by all MAs 406. Each of the exemplary MAs 406 has a user interface (UI) associated with it, whereby a user can access the MA 406. Via an MA UI, a user may cause the MA 406 to perform a specified run (i.e., execute a task), such as an import run and an export run. The user can also read and update various information (e.g., version, configuration, description) associated with the MA 406 through an MA UI.

The exemplary I/O module 408 performs standard input/output tasks to communicate from the metadirectory and to one or more remote repositories. The exemplary I/O module 408 implements and supports any communications protocols suitable to the design, such as, but not limited to, Distributed Component Object Model (DCOM), Windows® Management Instrumentation (WMI), Hypertext Markup Language (HTML), and Simple Object Access Protocol (SOAP).

The exemplary User Interface (UI) 410 is an interface to the various modules in the executive layer, and in the metadirectory in general. The UI 410 enables a user to access, update, and otherwise interact with the metadirectory modules and the data therein. For example, a user may request download of an MA 406 configuration to perform test runs on a remote computer. As another example, a user may review synchronized data objects prior to importing the data objects into the metadirectory core.

Figure 5:
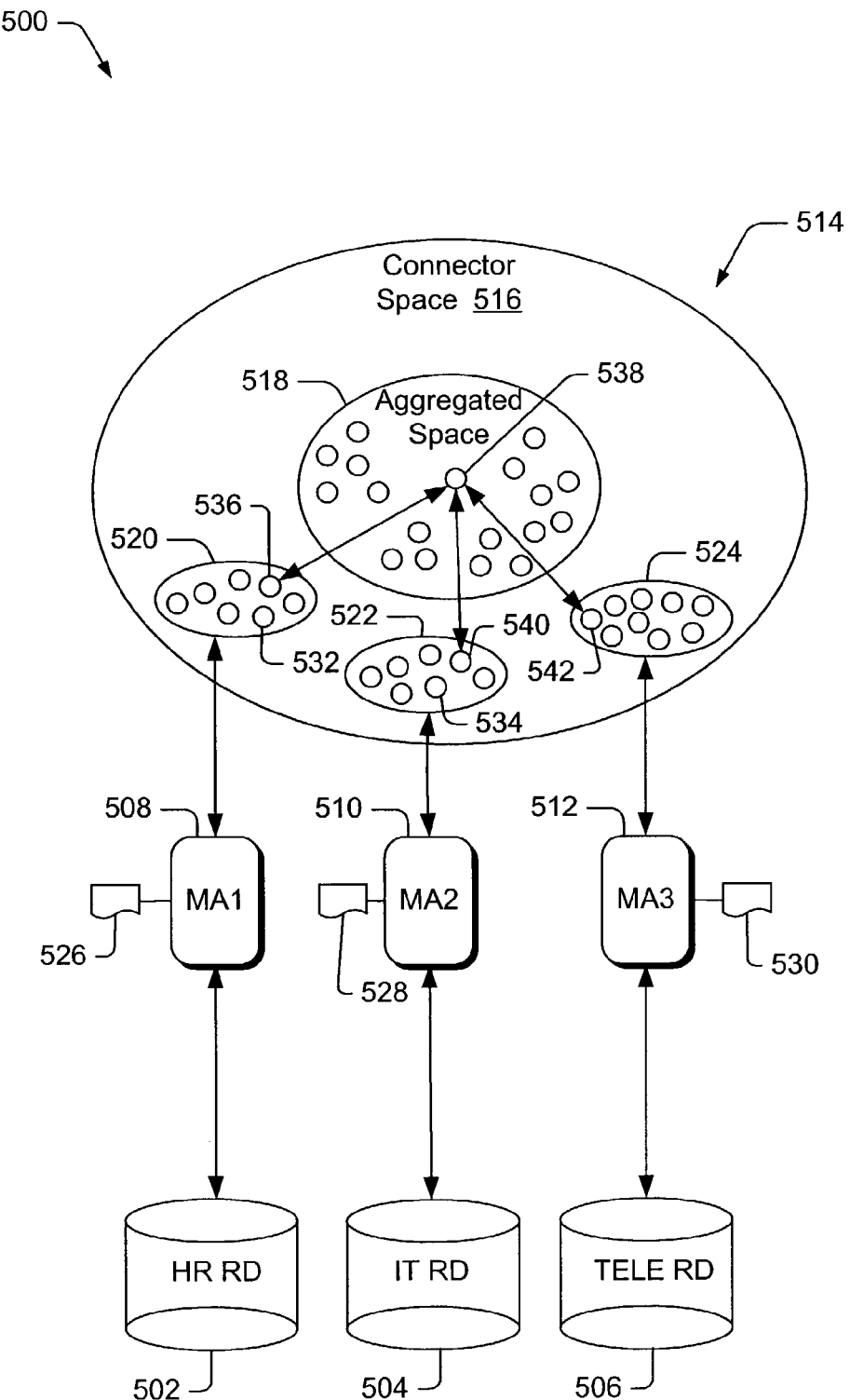
FIG. 5 is a block diagram illustrating an exemplary environment for use in a metadirectory scenario.

FIG. 5 is a block diagram illustrating an exemplary environment 500 for use in a metadirectory scenario. The exemplary environment includes a human resources (HR) remote directory (RD) 502, an information technology (IT) RD 504, and a telephone RD 506. The HR RD 502 is in operable communication with a first management agent (MA1) 508. The IT RD 504 is in operable communication with a second management agent (MA2) 510. The telephone RD 506 is in operable communication with a third management agent (MA3) 512.

MA1 508, MA2 510, and MA3 512 are in operable communication with storage 514. The storage 514 is an exemplary implementation of the storage layer 106, shown in FIG. 1 and/or the storage layer 212, shown in FIG. 2. The exemplary storage 514 is partitioned, or otherwise divided, into a first namespace, called a connector space (CS) 516, and a second namespace, called an aggregated space (AS) 518. The CS 516 is an exemplary implementation of the metadirectory buffer 110, shown in FIG. 1, and/or the metadirectory buffer 216, shown in FIG. 2. The AS 518 is an exemplary implementation of the metadirectory core 108, shown in FIG. 1, and/or the metadirectory core 214, shown in FIG. 2.

The connector space 516 is partitioned, or otherwise divided, into one or more connector space regions that are used by the MAs. MA1 508 communicates with a first connector space region (CS1) 520. MA2 510 communicates with a second connector space region (CS2) 522. MA3 512 communicates with a third connector space region (CS3) 524.

Each of the MAs uses the MA's associated connector space regions to import, and otherwise process objects from the MA's associated RD. For example, MA1 imports objects from the HR RD 502 and populates CS1 520 with the imported objects. The MAs may import objects from the RDs at any time. For example, the MAs may import objects periodically, or upon the occurrence of a specified event, such as power-up, or user request. Each of the MAs may import objects independently from the other. In one exemplary implementation, MA2 510 imports objects from IT RD 504 whenever IT RD 504 powers up, while MA3 512 imports objects from telephone RD 506 once per day. In another exemplary implementation, a user may initiate a simultaneous import at MA1, MA2, and MA3.

Each of MA1 508, MA2 510, and MA3 506, has a schema, schema 526, schema 528, and schema 530, respectively, associated with the MA. The schemas each may have information, such as objects, object types, and attributes available from the associated remote directory. The schemas 526, 528, and 530 may also include filtering criteria that may be used by a synchronization engine to determine which objects and attributes to project into the aggregated space 518. The exemplary schemas, 526, 528, and 530 may or may not be stored in the storage 514. In a particular implementation, the schemas are stored in a separate storage area that is accessible to the MAs and a synchronization engine.

To illustrate an exemplary metadirectory operation, an exemplary scenario is described. The exemplary HR RD 502 transmits one or more objects to the MA1 508. The MA1 508 populates the CS1 520 with the one or more HR objects 532 that the MA1 508 receives from the HR RD 502. The MA1 508 may transform, or otherwise format the one or more received HR objects 532 according to rules specified in the schema 526. Similarly, the exemplary IT RD 504 transmits one or more IT objects to the MA2 510. The MA2 510 populates the CS2 522 with the one or more IT objects 534 that the MA2 510 receives from the IT RD 504. The MA2 510 may transform, or otherwise format the one or more received IT objects 534 according to rules specified in the schema 528.

The exemplary HR objects 532 and the IT objects 534 may be aggregated into the aggregated space (AS) 518 during a synchronization process. For example, an HR object 536 may be joined with an exemplary aggregated objected 538, which corresponds to the HR object 536. The aggregated object 538 may correspond to the HR object 536 if the two objects are person objects, having the same "name" value for their "name" attributes.

Likewise, an IT object 540 and a Tele object 542 may be joined to the aggregated object 538. After the HR object 536, the IT object 540, and the Tele object 542 are joined to the aggregated object 538, attributes of the objects 536, 540, and 542 may be imported to the aggregated object 538. For example, the "name" attribute of the HR object 536 may be imported to the aggregated object 538, the "e-mail address" attribute of the IT object 540 may be imported to the aggregated object 538, and the "home telephone" attribute of the Tele object 542 may be imported to the aggregated object 538.

Attributes of the aggregated object 538 can be exported to joined objects in the connector space 516. For example, the "name" attribute of the aggregated object 538 may be exported to the IT object 540 and the Tele object 542. As another example, the "e-mail address" attribute of the aggregated object 538 may be exported to the HR object 536 and the Tele object 542. As a further example, the "home telephone" attribute of the aggregated object 538 may be exported to the IT object 540 and the HR object 536. After the attributes are exported, and the objects are synchronized, the HR objects, the IT objects, and the Tele objects may be transmitted to the HR RD 502, IT RD 504, and Tele RD 506, respectively.

In an exemplary implementation, data in the remote repositories is hierarchical. That is, the objects from each of the RDs reside at nodes in a hierarchy. Thus, for example, the HR RD 502 may transmit a hierarchical structure, specific to the HR department, which includes a "department" object at a root node, and "employee" objects at nodes below the root node; below the employee objects could be other nodes including other object types, such as "supervisor," "job title," "computer," and the like. Each object has attributes with associated attribute values. For example, an "employee" object can have a "name" attribute, a "social security number" attribute, a "salary" attribute, a "vacation days" attribute, etc. The hierarchy that the MA1 506 receives from the HR RD 502 may be different from a hierarchy that MA2 508 receives from the IT RD 504. That is, the nodes, objects, and/or attributes of the HR hierarchy may not match the nodes, objects, and/or attributes of the IT hierarchy.

Continuing with the exemplary implementation, wherein RDs use hierarchical data structures, each of the MAs receive hierarchical data (e.g., objects, nodes, attributes) from the RDs. The hierarchical data may be all the data in a hierarchy or only changes (i.e., a delta) in the hierarchy that have been made since the hierarchical data was last communicated to the MAs. In a particular implementation, the standard Lightweight Directory Access Protocol (LDAP) is used to communicate the hierarchical data from the RDs to the MAs. Each of the MAs stores the hierarchical data in the MA's associated connector space. In an exemplary implementation of the connector space 516, data is stored in an isomorphic, yet hierarchical fashion, wherein each of the connector spaces (CS1 520, CS2 522, and CS3 524) use a common form. Thus, each of the connector spaces holds a hierarchy of nodes, objects, and attributes in an isomorphic form.

As is discussed in further detail below, the hierarchies in the connector space 516 are transformed into a flat, relational directory 540 when the objects in the connector space partitions (i.e., CS1 520, CS2 522, and CS3 524) are aggregated into the AS 518. Thus, the AS 518 holds data in a relational directory 540, and not a hierarchical structure (although the relational directory 540 can be used to obtain a selected hierarchy, for example by using Boolean expressions, as discussed below). In an exemplary implementation, a synchronization engine (SE) (e.g., the SE 402, FIG. 4) performs the conversion from the hierarchical structures in the CS 516 to the relational directory 540 in the AS 518. In general, the conversion process involves extracting meaningful information from the hierarchy, nodes, objects, and attributes in the connector space 516, and entering the meaningful information in the directory 540, wherein data is logically related, but not necessarily hierarchically.

One implementation of the relational directory 540 is a database, such as a Structure Query Language (SQL) database. As such, the relational directory 540 enables users or applications to query the relational directory 540 using database commands. Any of various database commands, including Boolean expressions, can be applied to the relational directory 540 (e.g., via an SQL interface) to gather relational information about the objects. For example, a user may query the database for all employees who have a salary range of $40,000 to $50,000 and whose supervisors are either "Smith" or "Jones." Such relational information is easily obtainable from the relational directory 540 by applying known queries to the relational directory 540.

Figure 6:
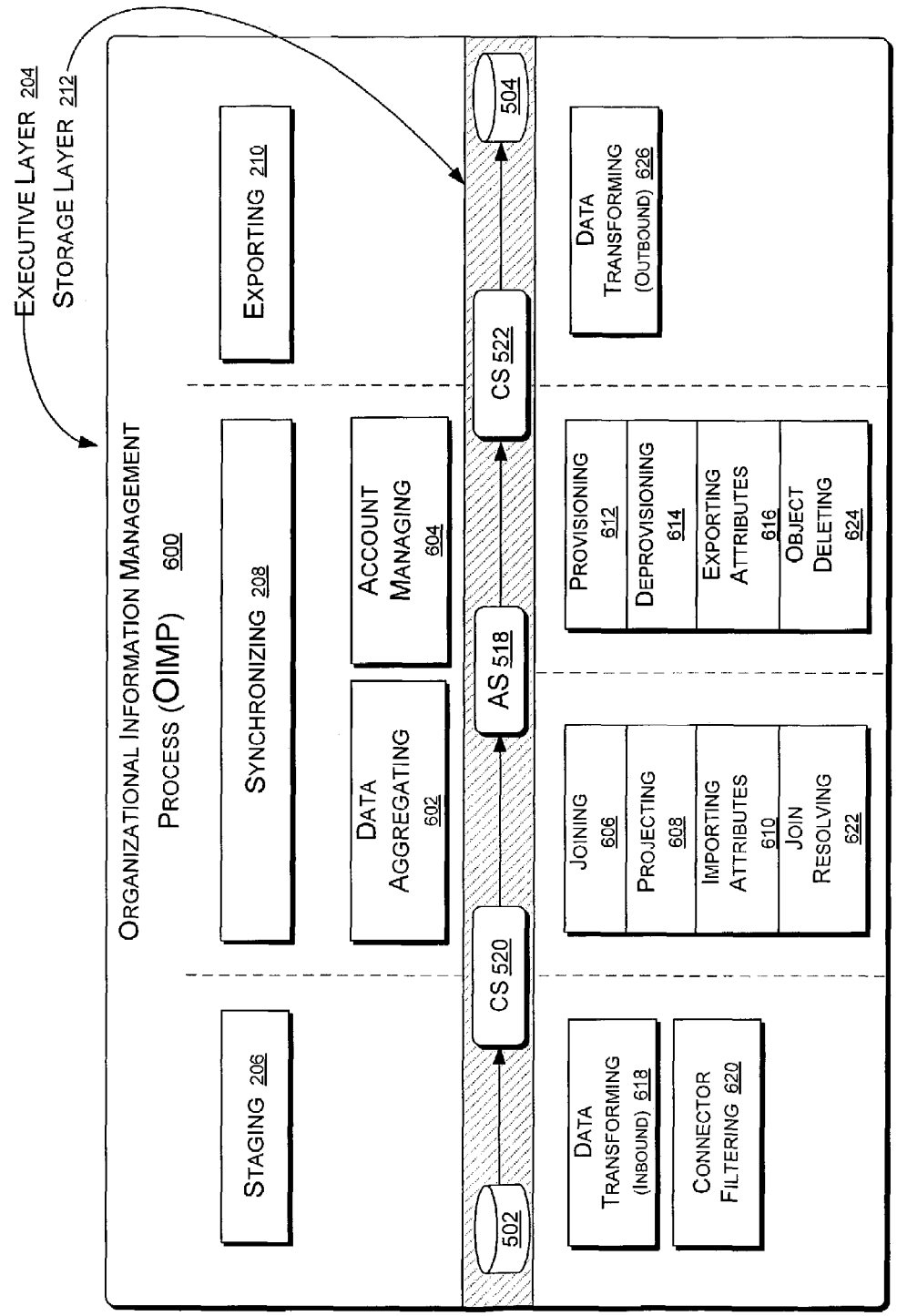
FIG. 6 is a block diagram of an exemplary identity information management process.

FIG. 6 illustrates an exemplary "organizational information management process" (OIMP) 600 that can be implemented in an environment such as the environment shown in FIG. 5. The exemplary OIMP 600 includes staging (e.g., staging 206, FIG. 2) 21 synchronizing (e.g., synchronizing 208, FIG. 2), and exporting (e.g., exporting 210, FIG. 2), as well as other data processing that facilitates data integrity across more than one connected information source.

Such additional processes include, for example, data aggregating 602, and account managing 604. Further, such additional processes may have sub-processes. For example, data aggregating 602 may include joining 606, projecting 608, importing attributes 610, and join resolving 622. Joining 606, for example, is a process that may involve establishing a service to determine whether an attribute of an object in the connector space 520 will be joined with an object in the aggregated space 518. Account managing 604 may include provisioning 612, deprovisioning 614, exporting attributes 616, and object deleting 624.

In general, such processes and/or sub-processes may be carried out by any of a variety of modules described herein, including, one or more Management Agents (MA), a synchronization engine (SE), a rules engine (RE), or an MA controller. Any or all of such modules carry out the exemplary processes shown in FIG. 6 in accordance with rules and/or specifications, examples of which are described in detail below. Such rules and/or specifications may be flexible and extensible and may be designed to ensure that the most valued, most correct, and/or user-selected data reside in the aggregated space 518 and in one or more connected information sources 504, as appropriate to the particular setting. Some of these processes and sub-processes will be discussed in more detail below with respect to customization of the exemplary rules by which the processes are implemented.

In some implementations of the exemplary metadirectory 200 the processes in the exemplary OIMP 600 are executed in a relatively well-defined sequence; that is to say, the various parts of the exemplary OIMP 600 are not performed at random, haphazardly, or in total separation from each other. Many of the processes performed with respect to the OIMP 600 are done so as specified in rules, as discussed throughout. Exemplary rules are implemented as schemas in Extensible Markup Language (XML), discussed in detail in the related U.S. patent application Ser. No. 10/435,113, entitled "Declarative Rules for Metadirectory."

Exemplary Operations

This section describes a number of flow charts describing exemplary operations that may be carried out by the systems describe above with reference to FIGS. 1-6, and FIG. 10.

Figure 7:
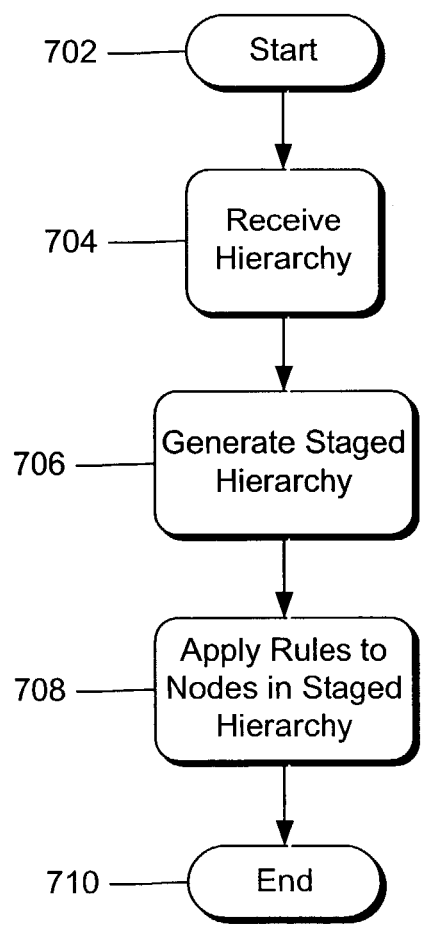
FIG. 7 is a flow chart illustrating exemplary operations that may be used to create a relational directory.

FIG. 7 is a flow chart illustrating an exemplary creating operation 700 that may be used to create a relational directory. In general, a hierarchy of organizational data is received, a staged hierarchy is generated, and a relational directory is created based on the staged hierarchy.

After a start operation 702, a receiving operation 704 receives a hierarchy of organizational data. In an exemplary implementation, a management agent (MA) (e.g., the MA1 508) receives a hierarchy of data from an organizational department's remote directory (e.g., the HR RD 502). The received hierarchy include a root node and branch nodes, with data at each node. The data at each node may be a node identifier, such as a label, a container, or other data, such as an object. The objects in a hierarchy may be queried from the remote directory using any protocol known in the art, such as X.500, Lightweight Directory Protocol (LDAP) including controls such as DIRSYNC and virtual list view (VLV), or vendor-specific protocols.

A generating operation 706 generates a staged hierarchy based on the received hierarchy. The generating operation 706 transforms the hierarchy of the incoming format (i.e., X.500, Active Directory®, etc.) into an isomorphic form used by all MAs in the metadirectory system. An exemplary generating operation 706 also creates a delta to the hierarchy of objects that were received. This delta represents any changes that have been made to the data in the object since it was last received. This delta may record a positional change in the hierarchy such as rename or move. An exemplary generating operation 706 filters unwanted objects in the received hierarchy and stores only the objects of interest. Objects of interest are only those objects that have been identified as being necessary, relevant, meaningful, or otherwise useful to the remote directories. Objects of interest may be specified in memory, such as in a table, schema, or otherwise.

In one particular implementation of the generating operation 706, one or more hierarchies are flattened into a relational directory. In this implementation, component parts of an object's hierarchical name is preserved in a corresponding core object in the relational directory. For instance, in a Lightweight Directory Access Protocol (LDAP) implementation, the hierarchical, distinguished name (DN) of an object may be cn=JohnSm, ou=Developer, ou=IT, ou=US. In this example, the generating operation 706 stores "JohnSm" in a name attribute of the core object, "Developer" in a title attribute of the core object, "IT" in a division attribute of the core object, and "US" in a subsidiary attribute of the core object. Thus, components of a hierarchical name are converted into attributes of objects in the relational directory. Once in the relational directory, such component parts of a hierarchical name may be "mined".

Additionally, when component hierarchical information is put into a relational directory by the generating operation 706, the information is easily available to applications that may query the relational directory. By querying the relational directory, the applications need not parse a hierarchical name string (e.g., "cn=JohnSm, ou=Developer, ou=IT, ou=US). After data is put into the relational directory, it is possible to reconstruct a hierarchical name, for example, if the name is needed to create a corresponding object in another hierarchical directory. For example, during account management the components of a hierarchical name that are stored in the relational directory, can be easily combined.

To extract data from the relational directory, a declarative rule may be implemented that specifies how to associate various attributes in the relational directory to components in a hierarchical name. Thus, the declarative rule may specify "flow hierarchical name part 1 into relational directory attribute "name" or flow DN Part 3 into relational directory attribute "division." Hierarchical differences or changes may be taken into account when hierarchical name components are re-combined or extracted from the relational directory. For instance, if the "JohnSm" object (from above) was to appear in a European directory, the components might be recombined as "cn=JohnSm, ou=Developer, ou=IT, ou=US, ou=OtherSubsidiaries."

An applying operation 708 applies preconfigured rules to nodes in the received hierarchy. In one implementation, the applying rules operation 708 is executed during a synchronization process, wherein data in the hierarchy is synchronized with data in other hierarchies and in the relational database. Applying rules includes applying import attribute flow (IAF) rules, join rules and projection rules. An import attribute flow is a process of associating an attribute of one object with another object, and is discussed in detail below with regard to FIG. 9. Detailed discussions of join rules and projection rules are given below with regard to FIG. 9.

Figure 8:
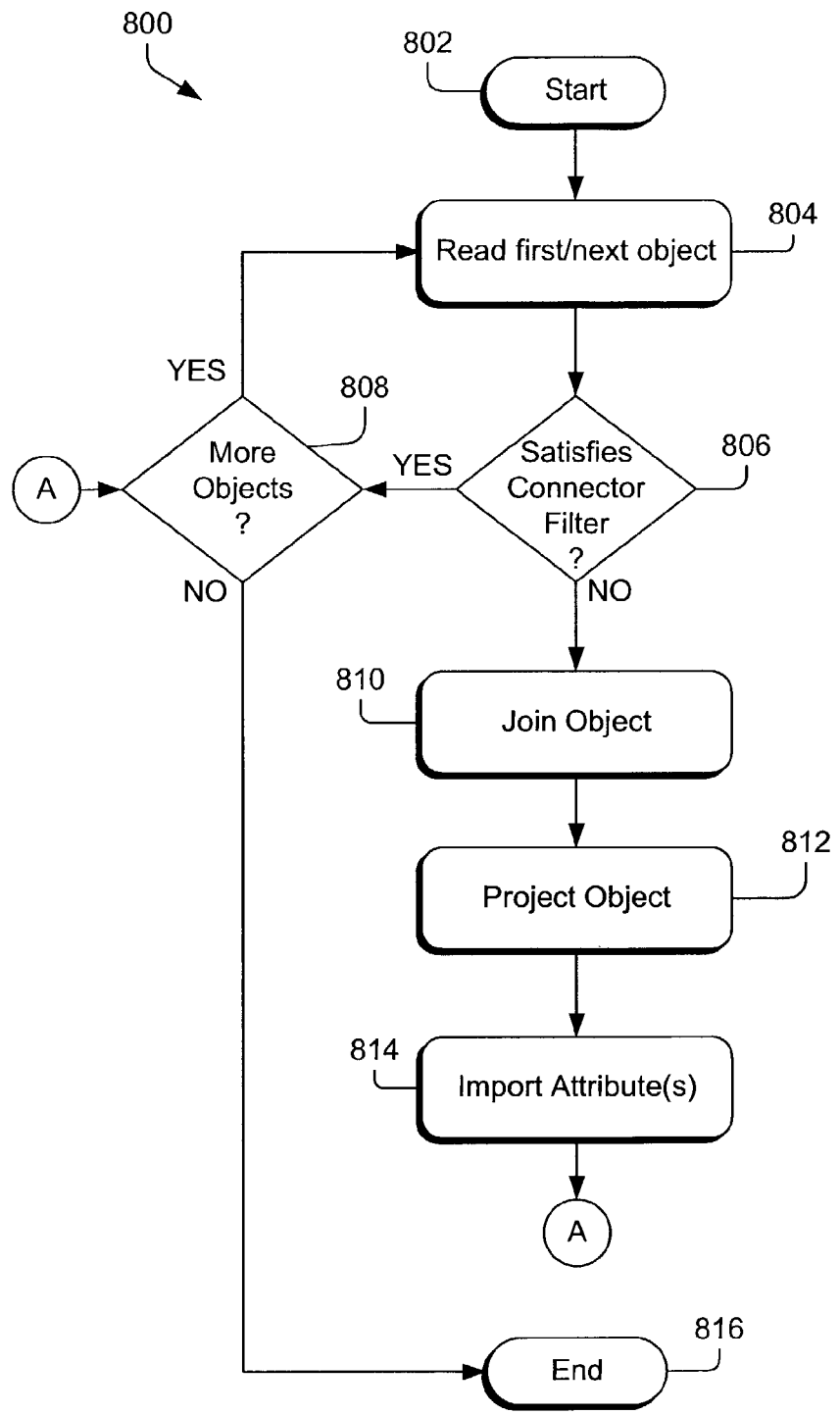
FIG. 8 is a flow chart illustrating exemplary operations that may be used to create object entries in a relational directory from a given object.

FIG. 8 is a high-level flow chart illustrating an exemplary flattening operation 800 that may be used to populate a relational directory based on objects from a hierarchical directory. After a start operation 802, a reading operation 804 reads a first object from the hierarchy (i.e., a hierarchical object) and associated attributes. A first query operation 806 determines whether the object satisfies connector filter rules that may be declared by a user.

The connector filter rules (describe in more detail in related U.S. patent application Ser. No. 10/435,113, entitled "Declarative Rules for Metadirectory") used by the first query operation 806, specify whether the hierarchical object should not be connected to a corresponding object in the relational directory. A user, such as a systems administrator, can define filter criteria based on object types and object attributes, such that certain types of objects and/or attributes are not projected into the relational directory, or joined to an object in the relational directory. If the hierarchical object satisfies the connector filter rules (i.e., should be filtered), the flattening operation branches "YES" to a second query operation 808.

The second query operation 808 determines whether more objects are in the hierarchy to be analyzed. If more objects are in the hierarchy, the flattening operation 800 branches "YES" to the reading operation 804, which reads the next hierarchical object. If no more objects remain in the hierarchy, the flattening operation 800 branches "NO" to an end operation 816, where the flattening operation 800 ends.

If the first query operation determines that the hierarchical object does not satisfy the connector filter rules, the flattening operation 800 branches "NO" to a joining operation 810. The joining operation 810 joins the hierarchical object in a staging area (e.g., CS1 520, FIG. 5) to a corresponding object, if one exists, in the relational directory of an aggregated space (AS) (e.g., the AS 518, FIG. 5) according to join rules. A more detailed description of an exemplary joining operation is presented below with regard to FIG. 9.

A projecting operation 812 may project the hierarchical object from the staging area into the relational directory. A more detailed description of an exemplary projecting operation is presented below with regard to FIG. 9. An importing operation 814 flows (i.e., copies) one or more attributes of the hierarchical object from the staging area to one or more joined objects in the relational directory according to import-attribute-flow (IAF) rules. A more detailed description of an exemplary importing operation is presented below with regard to FIG. 9.

Figure 9:
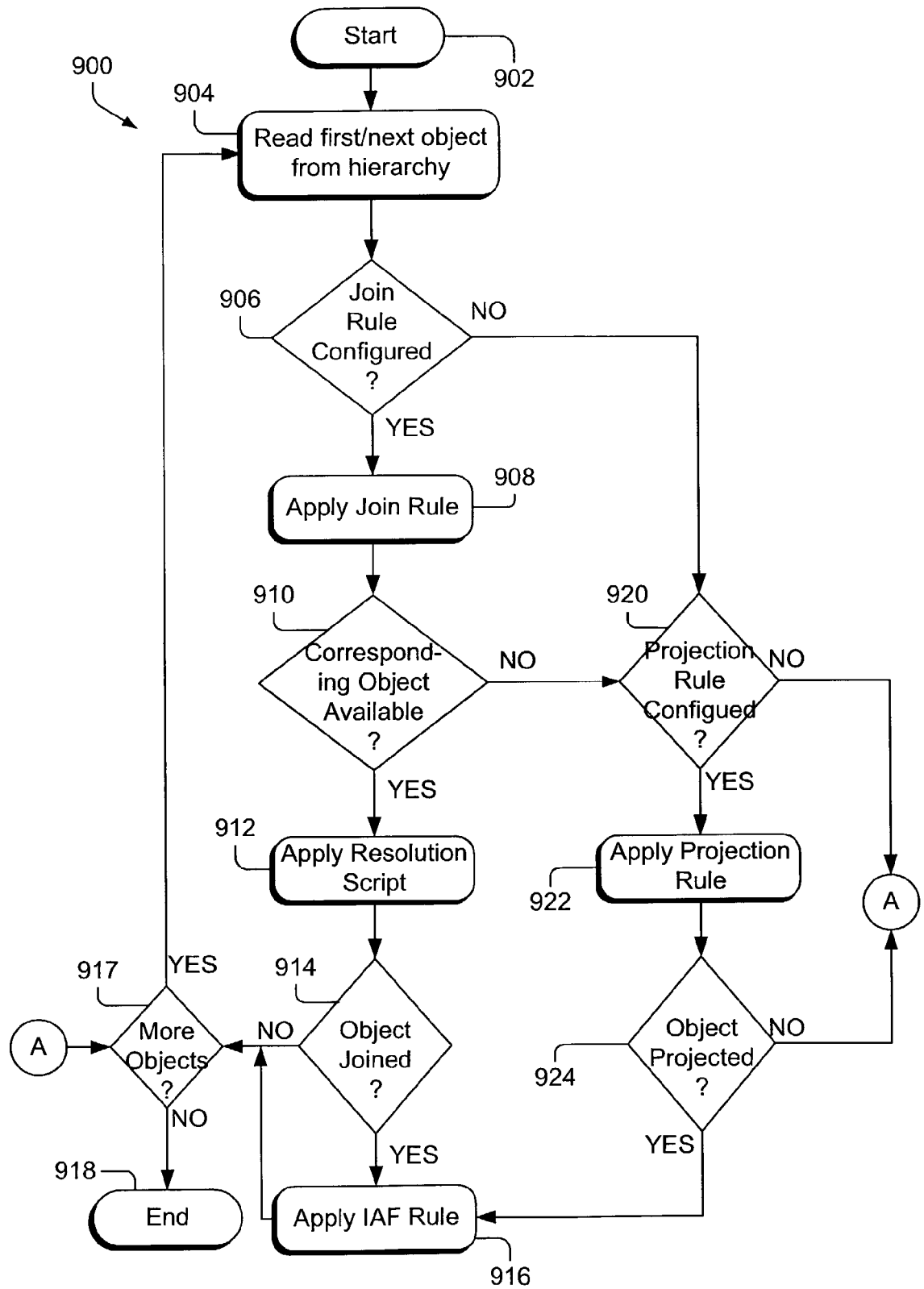
FIG. 9 is a flow chart illustrating exemplary operations that may be used to create object entries in a relational directory from objects in a hierarchy using rules that specify projection, joining, and attribute import.

FIG. 9 is a detailed flow chart illustrating another exemplary flattening operation 900 that may be used to create object entries in a relational directory from objects in a hierarchy based on projection rules, joining rules, and attribute import flow rules. In general, the flattening operation 900 iterates through one or more objects in a hierarchy and determines for each object whether the object should be joined to a corresponding object in a relational directory. If no corresponding object exists in the relational directory, the flattening operation determines if the object in the hierarchy should be projected into the relational directory. After projecting and/or joining a hierarchical object to a corresponding object in the relational directory, the flattening operation 900 imports attributes from the hierarchical object to the corresponding object. Prior to executing the flattening operation 900, objects from a hierarchy may be analyzed with respect to connector filter rules to determine whether the corresponding objects should be created in the relational directory (for example, see the first query operation 806 in FIG. 8).

The discussions herein may not be particularly detailed with regard to rules that may be applied. For a detailed discussion of rules (i.e., rule types, rule descriptions, scripts, schemas, specifications, etc.), the reader is directed to the related U.S. patent application Ser. No. 10/435,113, entitled "Declarative Rules for Metadirectory."

After a start operation 902, a reading operation 904 reads a first object from a hierarchy of objects. One implementation of the reading operation 904 reads an object out of a connector space (e.g., the connector space 520, FIG. 5) that has been populated with objects by an associated management agent (MA) (e.g., the MA1 508). After the reading operation 904, a first query operation 906 determines whether a join rule is configured for the object.

The first query operation 906 determines whether join rules have been created for the associated MA, for example, by a system administrator. In an exemplary implementation, the first query operation 906 reads a schema (e.g., the schema 526, FIG. 5) associated with the MA, and searches for join rule elements. If join rule elements are found in the schema, the flattening operation 900 branches "YES" to a first applying operation 908.

An exemplary first applying operation 908 accesses the join rules that were found in the first query operation 906. The join rules include specifications regarding whether and how to join an object in the hierarchy to a corresponding object in the relational directory. For example, the join rules may specify that an object in the relational directory corresponds to the hierarchical object if the two objects have the same first name attribute value, the same last name attribute value, and the same telephone attribute value. The first applying operation 908 finds all corresponding objects in the relational directory, and outputs the number of corresponding objects found.

A second query operation 910 receives the output from the first applying operation 908 and determines whether at least one corresponding object already exists in the relational directory. If one or more corresponding objects exist in the relational directory, the flattening operation 900 branches "YES" to a second applying operation 912. The second applying operation 912 narrows the number of corresponding objects down to one if more than one corresponding object was found in the relational directory by the first applying operation 908. For example, the join rules that were applied in the first applying operation 908 may specify joining employee objects for which only the employee last name attribute matches. In this situation, it is possible that the join rules will identify more than one object in the relational directory that has a matching last name attribute. The second applying operation 912 chooses only one of the identified corresponding objects.

One implementation of the second applying operation 912 executes a resolution script to choose one of the identified corresponding objects. The resolution script is a user-provided script that specifies join criteria that is more narrowing than the join rules applied in the first apply operation 908. For example, the resolution script may further specify that the corresponding object must have a matching geographic location, and a matching department. After applying that criteria, if more than one corresponding object still exists, the resolution script may apply still more resolution criteria, and so on, until only one corresponding object has been identified.

When the number of corresponding objects is narrowed to only one corresponding object, the second applying operation 912 joins the corresponding object in the relational directory to the hierarchical object. Joining the two objects involves creating a pointer, hierarchy key, or other reference, to the hierarchical object. In one implementation, a persistent pointer is created in a list of persistent pointers associated with the corresponding object. Thus, after iterating through the flattening operation 900 multiple times, an object in the relational directory could have more than one hierarchical object linked to it; also, a hierarchical object could be linked to more than one object in the relational directory.

Advantageously, joining an object in the relational directory to an object in a hierarchical directory could include changing the object type associated with the object in the relational directory. During the flattening operation 900, an object may be projected (see fourth applying operation 922, below) that has an unrecognized object type. The projection operation may create an object in the relational directory with the unrecognized object type, along with any recognized attributes. An unrecognized object type is an object type for which no import-attribute-flow (IAF) rules are specified (see third applying operation 916). The unrecognized object type that is stored in the relational directory serves as a provisional object type, which can be updated later when more information is obtained about the object.

After an unrecognized object has been projected into the relational directory, the join criteria in the first applying operation 908 and the second applying operation 912 may later identify the unrecognized object as a corresponding object for a hierarchical object. The hierarchical object may have a recognized object type that is different from the unrecognized object type. In this situation, the object type of the corresponding object is changed to the recognized object type. This capability to automatically update object types may be useful in situations in which remote repositories employ object types that are different than the object types employed by the relational directory, but have similar meanings.

For example, the relational directory may recognize and use the object type "vendor," and not the object type "contractor." A vendor object may have attributes such as name, telephone number, product, contact, and vendor number. When a hierarchical object having object type "contractor" is encountered, the contractor object is created in the relational directory, but it may not include certain recognized attributes, such as a vendor number attribute. Later, a vendor object for a vendor whose name and telephone match the contractor's name and telephone is encountered in a hierarchy. The contractor object corresponds to the vendor object, but the vendor object type is preferred, so the joining rules will cause the object type of the contractor object to be changed to vendor. Because the vendor object type is recognized, IAF rules may cause additional attributes, such as the vendor number, to flow into the vendor object, when the IAF rules are applied (see third applying operation 916, below). The concept of updating an object type from an unrecognized object type to a recognized object type, and updating the object's attributes to those associated with the recognized object type is illustrated more generally in the flow chart of FIG. 10, and described in more detail below.

A third query operation 914 uses output from the second applying operation 912 to determine whether a corresponding object in the relational directory was joined to the hierarchical object. If the third query operation 914 determines that a corresponding object in the relational directory was joined to the hierarchical object, the flattening operation 900 branches "YES" to a third applying operation 916. The third applying operation 916 applies import-attribute-flow (IAF) rules. In one implementation, the synchronization engine obtains IAF rules from a schema that provides the IAF rules. The IAF rules specify whether and how an attribute value should flow between a hierarchical object and an object in the relational directory.

IAF rules provide a mapping that describes how to generate a destination attribute value given a set of source attribute values. For example, the IAF rules may specify that for an employee object type, the first name, last name, telephone number, social security number, job title, and department attributes should be imported into the corresponding object in the relational directory.

In addition, IAF rules may operate in conjunction with attribute value selection rules, whereby, for a given object type, attribute values may be based on attributes from more than one hierarchical object. For example, a person object in the relational directory could take the name attribute from a person object in the human resources (HR) hierarchy, but have an email address attribute that derives from a person object in the information technology (IT) hierarchy. For more information regarding IAF and attribute value selection rules, the reader is directed to concurrently filed U.S. patent application Ser. No. 10/434,725, entitled "Attribute Value Selection for Entity Objects."

Applying IAF rules might also involve applying rules extensions, filters, or modifying attributes. A more detailed discussion of rules extensions is presented in the U.S. patent application Ser. No. 10/435,708, entitled "Rules Customization and Related Methods."

If the third query operation 914 determines that the hierarchical object was not joined to the relational directory object, the flattening operation 900 branches "NO" to a fourth query operation 917, which determines if more objects are in the hierarchy. If more objects are in the hierarchy, the flattening operation 900 returns to the reading operation 904 via "YES" branch, wherein the next hierarchical object is read from the hierarchy. The flattening operation will repeat until no more objects are left in the hierarchy to be projected or joined. If the fourth query operation 917 determines that more objects are in the hierarchy, the flattening operation 900 branches "NO" to an end operation 918 where the flattening operation 900 ends.

Referring again to the first query operation 906, if the first query operation 906 determines that no join rules have been configured for the hierarchical object or the connector space, the flattening operation branches "NO" to a fifth query operation 920. Referring again to the second query operation 910, if the second query operation 910 determines that no corresponding object is available, the flattening operation 900 branches "NO" to the fifth query operation 920.

The fifth query operation 920 determines whether projection rules have been configured for the hierarchical object. As discussed, the user may configure, or specify, projection rules suitable to the user's implementation. The user may configure the projection rules in schema or other type of document. In one implementation of the fifth query operation 920, the schema is accessed and projection rules are searched for in the schema. If no projection rules are found in the schema, the flattening operation 900 branches "NO" to the fourth query operation 917 (via on-page reference "A"), where it is determined whether more objects are in the hierarchy to be checked.

If the fifth query operation 920 determines that projection rules have been configured, the flattening operation branches "YES" to a fourth applying operation 922. The fourth applying operation 922 applies the projection rules identified in the fifth query operation 920. Projection rules specify whether and how an object is to be projected into the relational directory. In an exemplary implementation of the fourth applying operation 922, an "empty" object is created in the relational directory. The empty object has no attributes associated with it, but may take on the object type associated with the hierarchical object being projected into the relational directory. Alternatively, the projection rules may map the object type in the hierarchical object to another object type. For example, the projection rules may specify that object types "user" and "employee" are to be mapped to a "person" object type. As another example, the projection rules may specify that object types "printer" and "computer" are to be mapped to a "resource" object type.

After creating the object in the relational directory, the fourth applying operation 922 automatically joins the newly created object with the associated hierarchical object. As mentioned, joining an object in the relational directory to a hierarchical object involves creating a persistent pointer or key from the relational directory object to the hierarchical object.

A sixth query operation 924 determines whether the hierarchical object was successfully projected into the relational directory, based on output from the fourth applying operation 922. If the hierarchical object was not projected, the flattening operation 900 branches "NO" to the fourth query operation 917 (via on-page reference "A"). If the hierarchical object was projected, the flattening operation 900 branches "YES" to the third applying operation 916, wherein import-attribute-flow (IAF) rules are applied for attributes of the hierarchical object, as described above.

After the relational directory is developed using operations, such as those described above, objects and their attributes may be exported out of the relational directory into one or more hierarchical directories. Attributes of an object in the relational directory can be exported to an object in a hierarchy that is joined to the object in the relational directory. Exporting the attributes may involve applying export attribute flow rules to determine whether and how to export each attribute.

Figure 10:
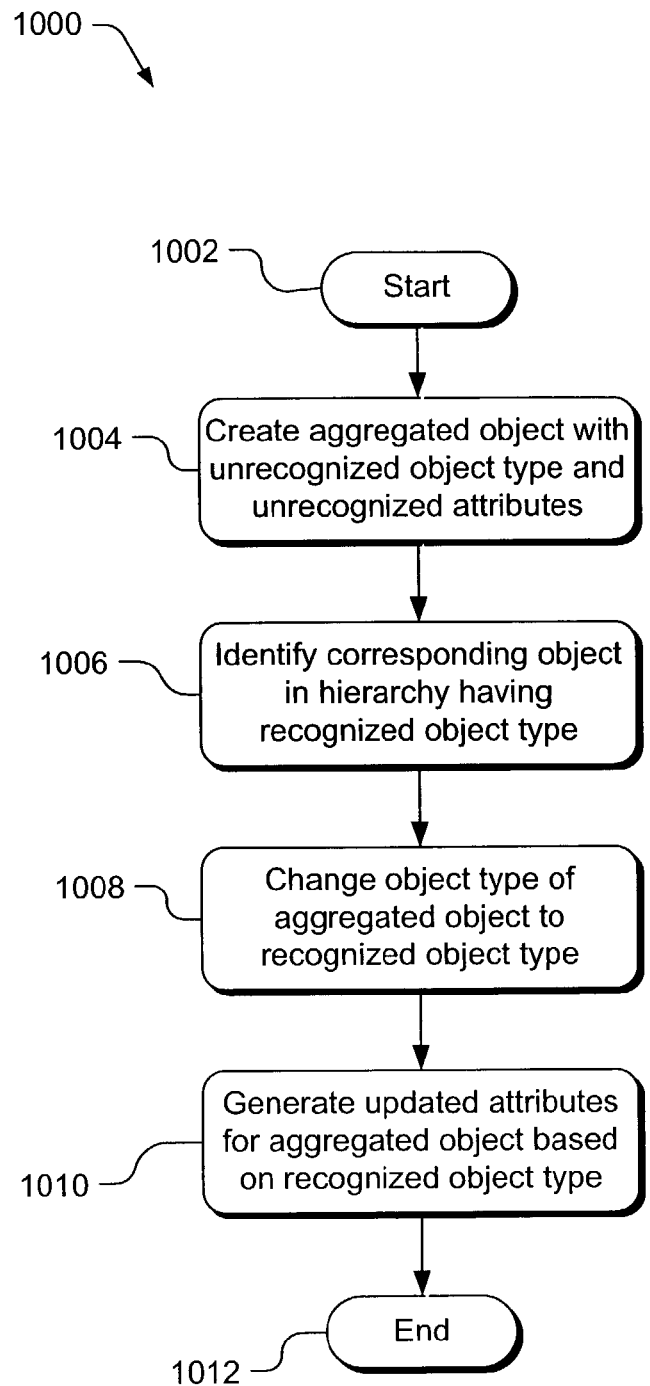
FIG. 10 is a flow chart illustrating exemplary operations that may be used to update object type and attributes associated with an object in a relational directory.

FIG. 10 is a flow chart illustrating an exemplary object type updating operation 1000 that may be used to update object type and attributes associated with an object in a relational directory.

After a start operation 1002, an exemplary creating operation 1004 creates an aggregated object with unrecognized object type and unrecognized attributes in the relational directory. The creating operation 1004 creates the object corresponding to an object in a hierarchy that has an object type for which projection rules and/or import attribute rules have not been specified. The object created in the creating operation 1004 has an unrecognized object type, and unrecognized attributes.

An exemplary identifying operation 1006 identifies an object in a hierarchy that corresponds to the aggregated object that was created in the creating operation 1004. The object in the hierarchy may be identified based on specified attribute values of the object in the hierarchy that match attribute values of the aggregated object. For example, the object in the hierarchy may have a name attribute value and a title attribute value that match the name attribute value and title attribute value of the aggregated object. The attribute values for which a match occurs between hierarchical objects and aggregated objects may be specified by the user (e.g., using join rules).

The hierarchical object identified in the exemplary identifying operation 1006 has an object type that is recognized and is different from the unrecognized object type associated with the aggregated object. A changing operation 1008 changes the object type of aggregated object to recognized object type. Because attributes associated with the recognized object type may differ from attributes of the unrecognized object type, a generating operation 1010 generates updated attributes for the aggregated object. In one implementation, import-attribute-flow (IAF) rules are created by the user that specify attributes that should be flowed into an aggregated object of a specified type. The updating operation 1000 ends at end operation 1012.

Exemplary Computer and/Computing System

Figure 11:
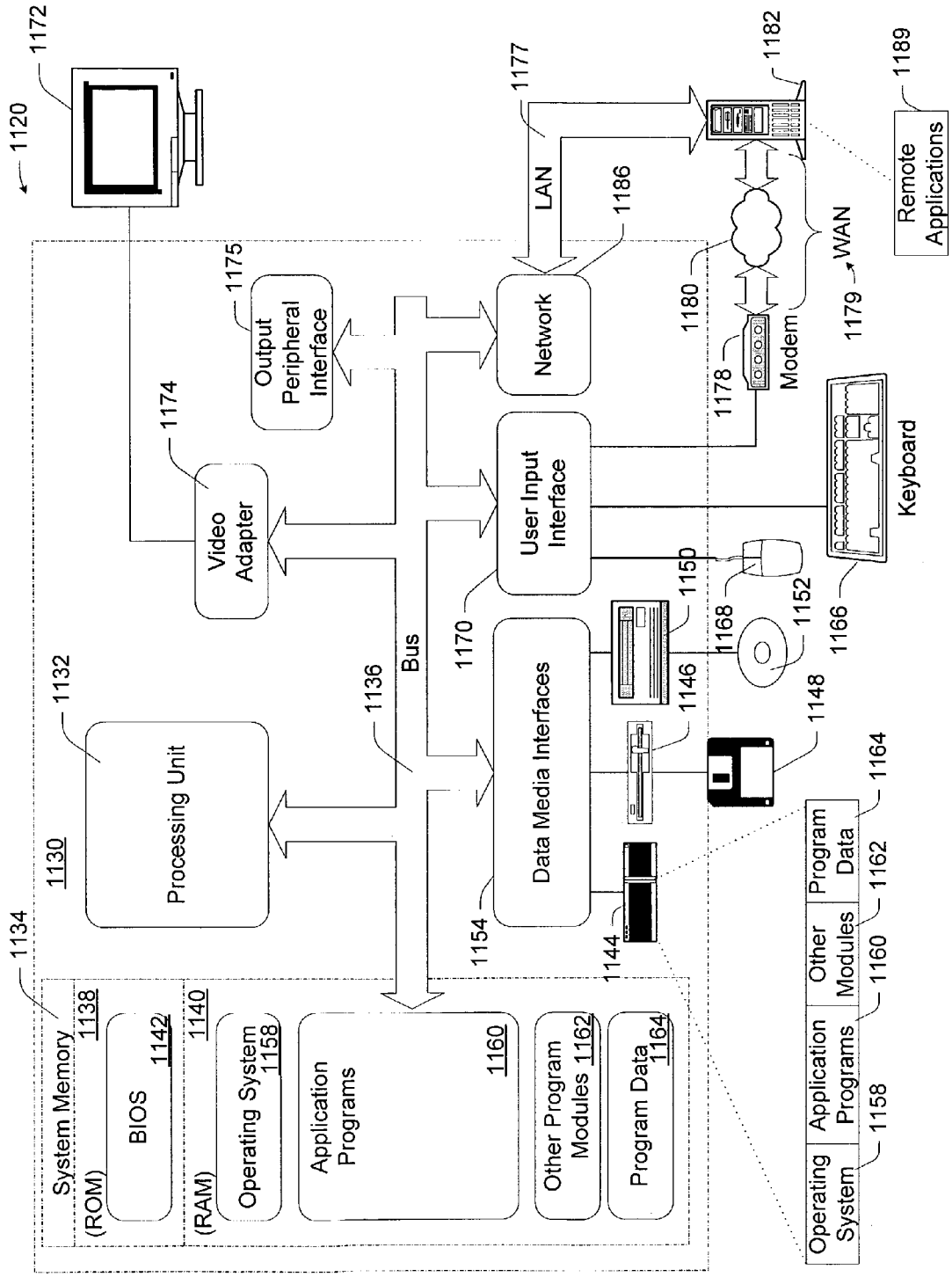
FIG. 11 is a block diagram illustrating an exemplary computer and/or computing environment suitable for use with various methods, units, system, and/or architectures described herein.

FIG. 11 illustrates an example of a suitable computing environment 1120 on which the previously described methods and/or storage media may be implemented.

Exemplary computing environment 1120 is only one example of a suitable computing environment and is not intended to suggest any limitation as to the scope of use or functionality of the improved methods and arrangements described herein. Neither should computing environment 1120 be interpreted as having any dependency or requirement relating to any one or combination of components illustrated in computing environment 1120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 11, computing environment 1120 includes a general-purpose computing device in the form of a computer 1130. The components of computer 1130 may include one or more processors or processing units 1132, a system memory 1134, and a bus 1136 that couples various system components including system memory 1134 to processor 1132.

Bus 1136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 1130 typically includes a variety of computer readable media. Such media may be any available media that is accessible by computer 1130, and it includes both volatile and non-volatile media, removable and non-removable media.

In FIG. 11, system memory 1134 includes computer readable media in the form of volatile memory, such as random access memory (RAM) 1140, and/or non-volatile memory, such as read only memory (ROM) 1138. A basic input/output system (BIOS) 1142, containing the basic routines that help to transfer information between elements within computer 1130, such as during start-up, is stored in ROM 1138. RAM 1140 typically contains data and/or program modules that are immediately accessible to and/or presently being operated on by processor 1132.

Computer 1130 may further include other removable/non-removable, volatile/non-volatile computer storage media. For example, FIG. 11 illustrates a hard disk drive 1144 for reading from and writing to a non-removable, non-volatile magnetic media (not shown and typically called a "hard drive"), a magnetic disk drive 1146 for reading from and writing to a removable, non-volatile magnetic disk 1148 (e.g., a "floppy disk"), and an optical disk drive 1150 for reading from or writing to a removable, non-volatile optical disk 1152 such as a CD-ROM, CD-R, CD-RW, DVD-ROM, DVD-RAM or other optical media. Hard disk drive 1144, magnetic disk drive 1146 and optical disk drive 1150 are each connected to bus 1136 by one or more interfaces 1154.

The drives and associated computer-readable media provide nonvolatile storage of computer readable instructions, data structures, program modules, and other data for computer 1130. Although the exemplary environment described herein employs a hard disk, a removable magnetic disk 1148 and a removable optical disk 1152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment. Of course, the exemplary computing environment 1120 may include an interface for one or more storage devices accessible via a standard or non-standard connection according to IEEE 1394, universal serial bus (USB), SCSI, fibrechannel, etc.

A number of program modules may be stored on the hard disk, magnetic disk 1148, optical disk 1152, ROM 1138, or RAM 1140, including, e.g., an operating system 1158, one or more application programs 1160, other program modules 1162, and program data 1164.

The improved methods and arrangements described herein may be implemented within operating system 1158, one or more application programs 1160, other program modules 1162, and/or program data 1164.

A user may provide commands and information into computer 1130 through input devices such as keyboard 1166 and pointing device 1168 (such as a "mouse"). Other input devices (not shown) may include a microphone, joystick, game pad, satellite dish, serial port, scanner, camera, etc. These and other input devices are connected to the processing unit 1132 through a user input interface 1170 that is coupled to bus 1136, but may be connected by other interface and bus structures, such as a parallel port, game port, or a universal serial bus (USB).

A monitor 1172 or other type of display device is also connected to bus 1136 via an interface, such as a video adapter 1174. In addition to monitor 1172, personal computers typically include other peripheral output devices (not shown), such as speakers and printers, which may be connected through output peripheral interface 1175.

Logical connections shown in FIG. 11 are a local area network (LAN) 1177 and a general wide area network (WAN) 1179. Such networking environments are commonplace in offices, enterprise-wide computer networks, intranets, and the Internet.

When used in a LAN networking environment, computer 1130 is connected to LAN 1177 via network interface or adapter 1186. When used in a WAN networking environment, the computer typically includes a modem 1178 or other means for establishing communications over WAN 1179. Modem 1178, which may be internal or external, may be connected to system bus 1136 via the user input interface 1170 or other appropriate mechanism. Of course, the environment 1120 may include extensive network switching and/or routing capabilities, including but not limited to security (firewall) functionality, virtual private network (VPN), QOS, etc.

Depicted in FIG. 11, is a specific implementation of a WAN via the Internet. Here, computer 1130 employs modem 1178 to establish communications with at least one remote computer 1182 via the Internet 1180.

In a networked environment, program modules depicted relative to computer 1130, or portions thereof, may be stored in a remote memory storage device. Thus, e.g., as depicted in FIG. 11, remote application programs 1189 may reside on a memory device of remote computer 1182. It will be appreciated that the network connections shown and described are exemplary and other means of establishing a communications link between the computers may be used.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

We claim:

1. A computer-implemented method of managing organizational data comprising:
   receiving a first hierarchy of data, the data comprising objects with attributes and attribute values;
   staging the first hierarchy in a buffer in an isomorphic form; and
   transforming the first hierarchy into a relational directory, wherein data stored in the relational directory in memory is in a flat non-hierarchical relational format and, wherein said transforming includes:
   identifying an object in the relational directory that corresponds to an object in the first hierarchy by applying a schema that relates attribute values in the object in the relational directory to attribute values in the object in the first hierarchy, wherein the object in the relational directory has an object type different than the object type of the object in the first hierarchy;
   changing the object type of the object in the relational directory to the object type of the object in the first hierarchy; and
   applying rules to generate updated attributes for the object in the relational directory based on attributes of the object in the first hierarchy.

2. The computer-implemented method as recited in claim 1 wherein transforming the hierarchy comprises:
   projecting an object in the first hierarchy into the relational directory, by creating an object in the relational directory that corresponds to the object in the first hierarchy.

3. The computer-implemented method as recited in claim 1 wherein transforming the first hierarchy comprises:
   projecting an object from the first hierarchy into the relational directory, by creating an object in the relational directory that corresponds to the object in the first hierarchy; and
   joining the object in the relational directory to the object in the first hierarchy.

4. The computer-implemented method as recited in claim 1 wherein transforming the first hierarchy comprises:
   projecting an object in the first hierarchy into the relational directory, by creating an object in the relational directory that corresponds to the object in the first hierarchy;
   joining the object in the relational directory to the object in the first hierarchy; and
   importing an attribute from the object in the first hierarchy into the relational directory.

5. The computer-implemented method as recited in claim 1 further comprising:
   receiving a second hierarchy of data, the data comprising objects with attributes and attribute values;
   joining an object in the first hierarchy with a corresponding object in the relational directory;
   associating an attribute from the object in the first hierarchy with the corresponding object in the relational directory; and exporting the attribute to an object in the second hierarchy.

6. The computer-implemented method as recited in claim 1 wherein the transforming comprises:
   mapping a first object type associated with an object in the first hierarchy to a second object type associated with a corresponding object in the relational directory according to projection rules.

7. The computer-implemented method as recited in claim 1 wherein the transforming comprises:
   choosing one attribute value to import to an object of an object type from among a plurality of attribute values associated with objects of the object type.

8. The computer-implemented method as recited in claim 5 further comprising:
   associating an attribute from an object in the second hierarchy with the corresponding object in the relational directory.

9. A system implemented by a computing device for managing organizational data originating from a plurality of remote directories comprising:
   a processor; and a memory, wherein the memory is encoded with:
- a plurality of management agents, each management agent in operable communication with an associated one of the plurality of remote directories, and configured to receive a hierarchy of organizational data from the associated remote directory; and
- a synchronization engine which is configured to receive the hierarchies from the plurality of management agents and create a relational directory of management data based on the data from the hierarchies and rules related to the management data, wherein data stored in the relational directory is in a flat non-hierarchical relational format and, wherein said synchronization engine identifies data with an unrecognized object type and changes said unrecognized object type to a recognized object type by applying a schema that relates attribute values in an object of the unrecognized object type to attribute values in an object of the recognized object type, wherein a set of the rules are applied to generate updated attributes for the unrecognized object based on attributes of the recognized object.

10. The system as recited in claim 9 wherein the rules comprise:
- projection rules specifying how to project data from one of the hierarchies into the relational directory.

11. The system as recited in claim 9 wherein the rules comprise:
- join rules specifying how to join data from one of the hierarchies with corresponding data in the relational directory.

12. The system as recited in claim 9 wherein the rules comprise:
- import attribute flow rules specifying how to import an attribute from one of the hierarchies into the relational directory.

13. The system as recited in claim 9 wherein the rules comprise:
- import attribute flow rules specifying that a first attribute associated with an object of an object type in a first hierarchy should be linked to a corresponding object in the relational directory, the import attribute flow rules further specifying that a second attribute associated with an object of the object type in a second hierarchy should be linked to the corresponding object in the relational directory.

14. A computer-implemented method of aggregating data from multiple repositories comprising:
- creating an aggregated object in an aggregated space of a metadirectory, wherein the aggregated object has an unrecognized object type, and wherein the aggregated space of the metadirectory comprises a relational directory, wherein data stored in the relational directory in memory is in a flat non-hierarchical relational format;
- identifying a corresponding non-aggregated object having a recognized object type by applying a schema that relates attribute values of the aggregated object having the unrecognized object type to attribute values of the corresponding non-aggregated object having the recognized object type;
- changing the object type of the aggregated object to the recognized object type; and
- applying rules to generate updated attributes for the aggregated object based on attributes of the corresponding non-aggregated object.

15. The computer-implemented method as recited in claim 14 wherein the non-aggregated object has one or more attribute values that match one or more corresponding attribute values of the aggregated object.

16. The computer-implemented method a recited in claim 14 further comprising:
- importing attribute values of unrecognized attribute types to the aggregated object.

17. The computer-implemented method as recited in claim 16 wherein the unrecognized attribute types are attribute types for which import attribute flow rules have been defined to specify importing the attribute types.

18. The computer-implemented method as recited in claim 16 further comprising:
- changing the unrecognized attribute types of the aggregated object to attribute types associated with the non-aggregated object.

* * * * *